(No Model.) 2 Sheets—Sheet 2.
B. F. SHUART.
SCRAPER.
No. 520,085. Patented May 22, 1894.
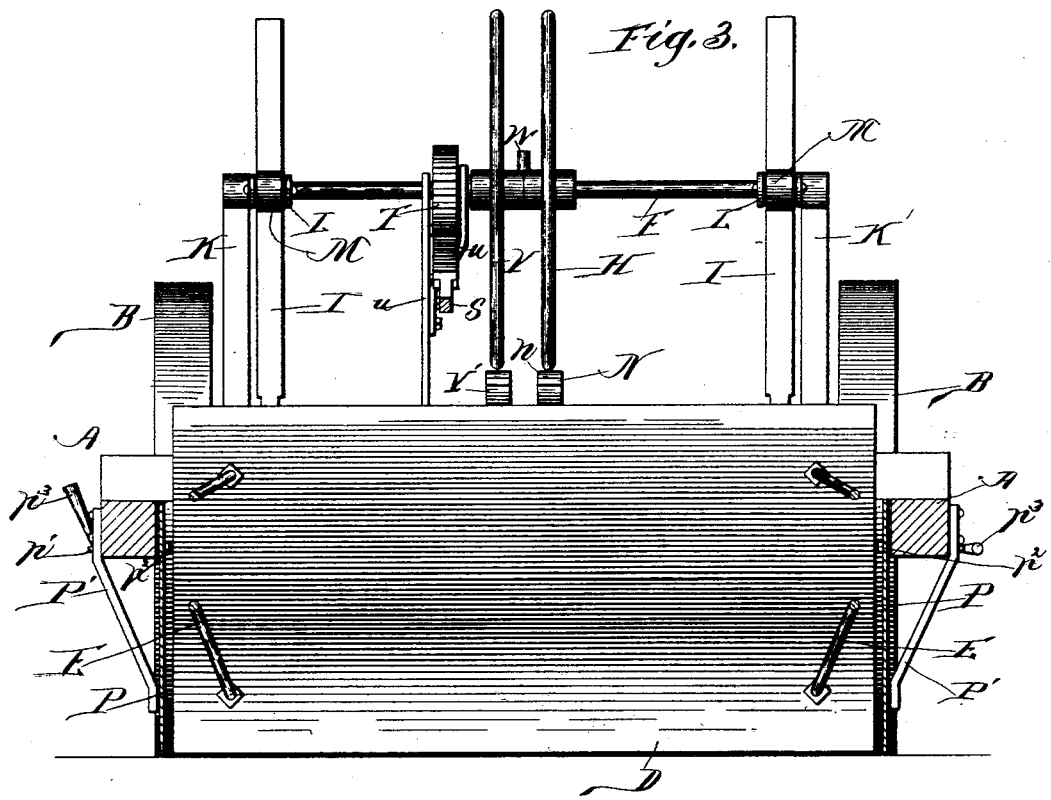
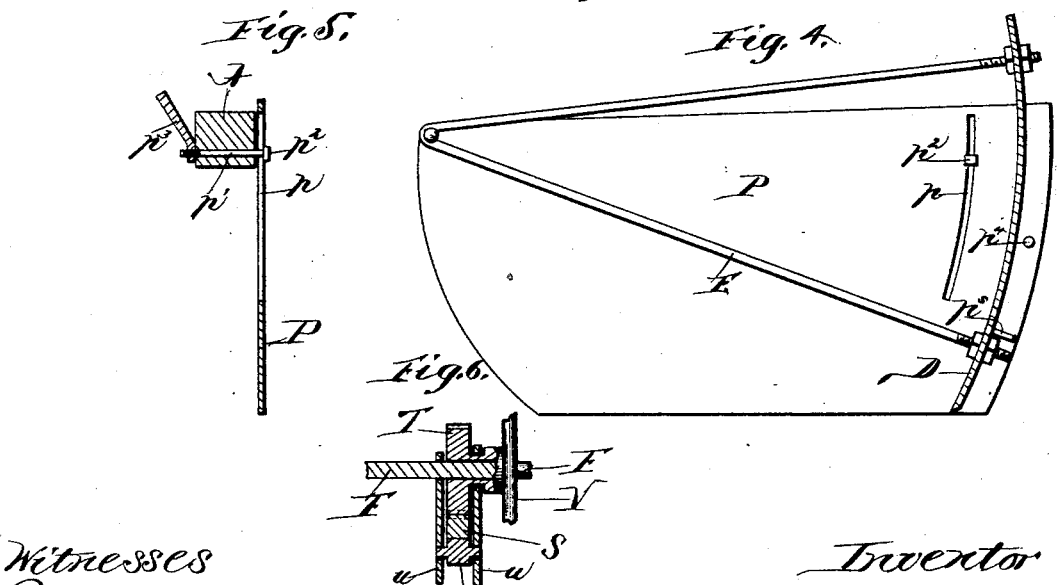
Witnesses
W. Middleton
Eveuasire
Inventor
Benjamin F. Shuart
By C. G. Page
Atty.

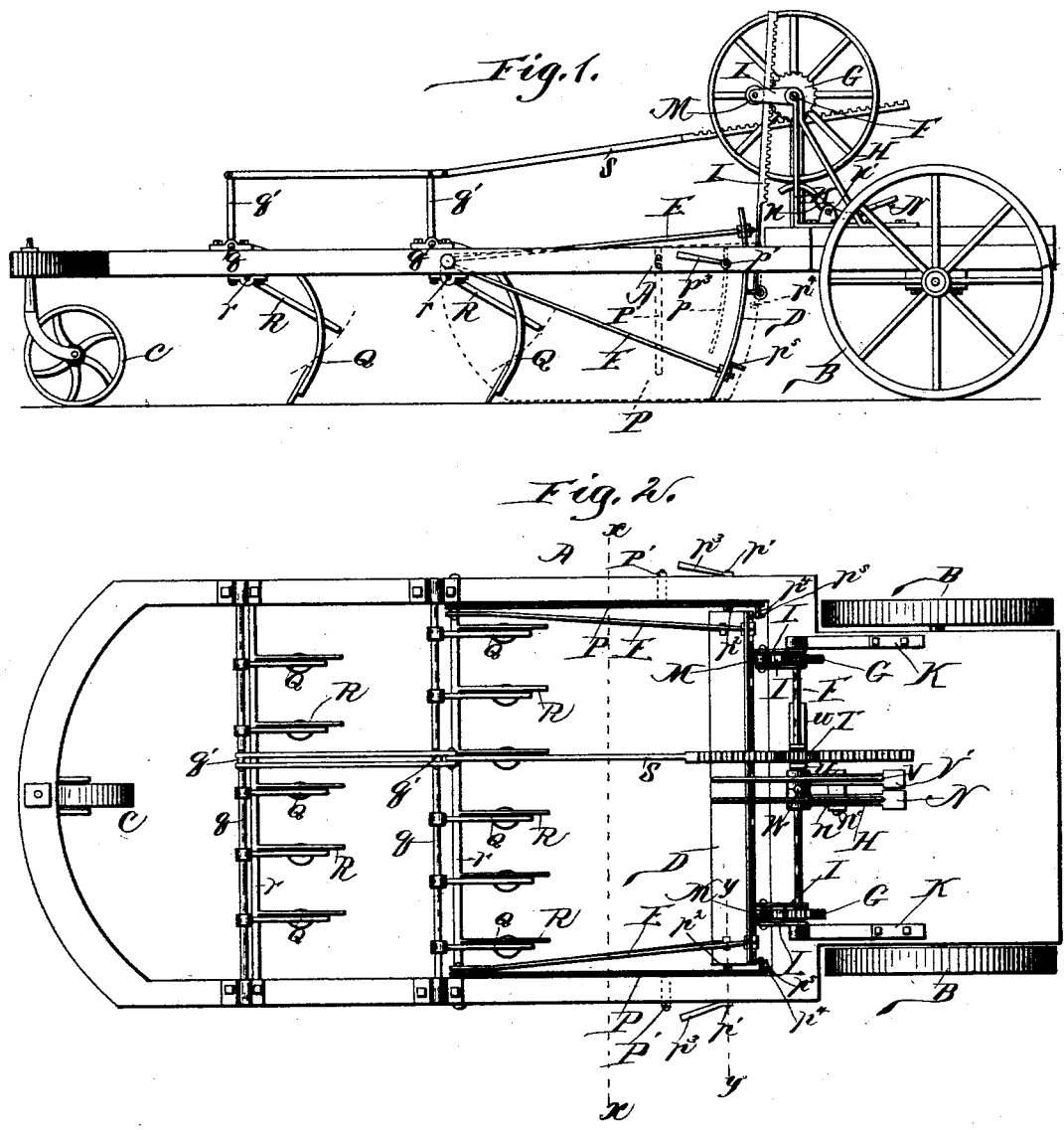

UNITED STATES PATENT OFFICE.

BENJAMIN F. SHUART, OF KENT, OHIO.

SCRAPER.

SPECIFICATION forming part of Letters Patent No. 520,085, dated May 22, 1894.

Application filed September 16, 1893. Serial No. 485,663. (No model.)

*To all whom it may concern:*

Be it known that I, BENJAMIN F. SHUART, a citizen of the United States, residing at Kent, in the county of Portage and State of Ohio, have invented a certain new and useful Improvement in Scrapers, of which the following is a specification.

My invention relates more particularly to scrapers of the kind embodied in Letters-Patent of the United States No. 476,691, granted and issued to me June 7, 1892, and No. 499,477, granted and issued to me June 15, 1893.

It is the purpose of my present application to cover certain improvements upon the devices of said Letters-Patent, and to include certain matters heretofore described in my application, Serial No. 442,975, for Letters Patent of the United States, which said application is referred to in my said Letters Patent No. 499,477.

The within described scraper is wheeled, and is provided with side fenders which are vertically movable, whereby they can be allowed to trail upon the ground, so as to prevent lateral spread of the scraped up soil, and also raised and held clear of the ground when not in use. The fenders thus arranged will also accommodate themselves to the surface of the ground, and when desired they can be adjusted and held at any desired height. Cultivator teeth are arranged in advance of the blade, and means are provided whereby the blade and cultivator teeth can be used either alternately or at one and the same time. Certain improvements in means for adjusting the blade and cultivator teeth are also provided as hereinafter described.

In the accompanying drawings,—Figure 1 is a side elevation of a wheeled scraper embodying my invention, some of the parts being shown in dotted lines. Fig. 2 is a top plan view. Fig. 3 is a cross section on line $x—x$ in Fig. 2. Fig. 4 is a detail view showing the inner side of one of the fenders and a section taken transversely through the blade. Fig. 5 is a section on line $y—y$ illustrating one of the fender locking devices. Fig. 6 is a section through the pinion T.

The wheeled body-frame A may be of any suitable construction, and is preferably provided with supporting wheels B, at the rear, and with a caster-wheel C at the front.

The horizontally arranged, curved scraper-blade D, is shown positioned for up and down movement at a point forward of the rear wheels, and is drawn from the main frame by vibratory arms or bails E which connect with the blade at its ends so as to balance the draft thereon and leave ample space for the scraped up soil.

The blade raising and lowering mechanism comprises a horizontally arranged rotary shaft F provided with a couple of pinions G, and carrying an operating hand-wheel H, and a couple of vertically movable racks I, which connect with the blade and engage the aforesaid pinions upon the shaft F. These racks are attached to the back of the blade by suitable joints or jointed connections so as to permit them to accommodate themselves to the movement of the blade, which latter will obviously rise and fall in the arc of a circle, owing to the fact that it is attached to swinging arms or bails. The end bearings for the rotary shaft F are arranged upon standards K which rise from opposite sides of the main or body-frame, and said standards are also provided with brackets L containing anti-friction guide-rolls M for the racks, it being seen that these rolls engage untoothed sides of the racks or rack-bars and while allowing the racks to tilt or vibrate during their up and down movements, maintain the same in constant engagement with the pinions.

The hand-wheel H can be temporarily or permanently fixed upon the shaft, but as a preferred arrangement it is permanently keyed or otherwise secured thereon and subject to a brake N arranged for locking the hand-wheel. The brake can be operated by an attendant standing upon the rear platform, and is desirably arranged so that it can be operated by foot power. As an exceedingly simple form of brake, I have shown a lever $n$ fulcrumed at $n'$, so that in order to lock the wheel, the attendant can step upon the rear arm of the brake-lever. I may however provide any suitable form of spring brake normally locking the hand-wheel, and since such brakes in conjunction with hand-wheels in blade-raising and lowering mechanisms are common in machines for making and repairing roads, special illustration of the same is not considered necessary.

The blade D is arranged between adjustable fenders P consisting of wings or plates which are pivotally held at their forward ends and arranged so that their lower edges can run upon the ground. These fenders prevent lateral spread of the soil scraped up by the blade, and are reinforced by braces P', attached to the body frame. By leaving the fenders free to rise and fall, they will adapt themselves to the inequalities of the ground. When thus left free to rise and fall, the fenders will obviously be self-adjustable, and since they are pivoted at their forward ends, they will trail upon the ground and run over or cut through raised portions of rough, loose soil without opposition, the extent to which the fender will cut into the soil in such cases being dependent upon the weight and thickness of the fender. These fenders can also be positively adjusted in height for certain kinds of work and to such end I can provide suitable locking devices. As an illustration of one of various locking devices which can be employed, I have shown the fenders provided with curved slots $p$ for bolts $p'$ which extend through these slots, and which have heads $p^2$ arranged for engaging the inner sides of the fenders. The bolts $p'$ are arranged for longitudinal adjustment through bearings in or on the body-frame, and their adjustment can be effected by hand-nuts $p^3$, whereby, when it is desired, the bolts can be adjusted so as to clamp their heads against the fenders. When for example the soil is loose and rough, and a certain extent of cut or penetration on the part of the fenders is desired, they can be locked down, but where such action is not desired, the fenders can be unlocked, and be left free to trail upon the ground. When the fenders are unlocked, it is sometimes desirable to raise them from the ground, and in order to permit this to be done without requiring the attendant to step from the machine, I provide means whereby the fenders can be raised by the blade raising and lowering mechanism. As a simple way of attaining such result, the fenders can be provided with studs $p^4$ upon their inner sides and the blade can be provided with corresponding studs $p^5$, the relative arrangement being such that after the blade has been raised to a suitable height, its studs will engage the studs on the fenders whereby a further rise on the part of the blade will cause it to lift the fenders. In this way, the blade can be raised and lowered for work, independently of the fenders, but when for example it is desired to raise both blade and fenders, the same can be attained by raising the blade to a greater height than is ordinarily required. I do not confine myself to studs for the foregoing purpose, since the blade can be adapted in various ways for engaging the fenders, for instance said members can be provided with any suitably formed projections.

The vibratory cultivator teeth Q are arranged upon rock-shafts $q$, forward of the blade, and wipers R for freeing the teeth from weeds and rubbish are fixed upon rods $r$ and arranged so that when the teeth are swung up, the latter will shear off toward the rear ends of the strippers or wipers, and thereby effectively dislodge all accumulation of weeds and rubbish.

The rock-shafts which carry the cultivator teeth are suitably journaled in or upon the body-frame, and are provided with arms $q'$. These said arms are link-connected with a movable rack S which extends back to and engages a pinion T on the shaft F. The pinion T is loose on the shaft, and the rack is upheld in engagement with the pinion by an anti-friction roll U arranged within the upper divided portion of a standard $u$ on the body-frame. This standard can also provide a bearing for the middle portion of the shaft. The pinion T is provided with an operating hand-wheel V, (which is controlled by a brake V') so that by operating such hand-wheel, the cultivator teeth can be raised and lowered as may be desired. In some instances it becomes desirable to cause the cultivator teeth to rise and fall simultaneously with the rise and fall of the blade, and to conveniently attain such end, the two-hand-wheels can be locked together, for example by means of a removable key W.

With further reference to the vertically movable fenders, it will be seen that when they are raised, their rear portions which are adjacent to the ends of the blade are raised clear off the ground, and hence that a general or bodily up movement on the part of the fenders would attain such result, although as a special and preferred arrangement, they have their forward ends pivotally hung so that they will trail rearwardly.

What I claim as my invention is—

1. A wheeled scraper comprising a vertically movable blade, and vertically movable side fenders independent of the blade and pivotally hung in advance of the same so as to trail rearwardly, substantially as described.

2. A wheeled scraper comprising a pair of vertically movable side fenders and a blade arranged for vertical movement independent of the fenders, the latter being positioned to extend forwardly from points adjacent to the ends of the blade and being arranged so that when raised, their rear portions adjacent to the blade shall rise from the ground, substantially as described.

3. A scraper comprising a vertically movable blade, vertically movable side fenders independent of the blade, and suitable means for raising and lowering the fenders, substantially as described.

4. A scraper comprising a vertically movable blade, vertically movable side-fenders independent of the blade, and suitable means for raising and lowering the blade and the fenders.

5. A scraper comprising a vertically movable blade, vertically movable side fenders independent of the blade, and a raising and lowering mechanism for raising and lowering the blade and for raising the fenders after the blade has been lifted clear of the ground, substantially as described.

6. A scraper comprising a vertically swinging blade D arranged between side-fenders and provided at its ends with forwardly extending draft-arms E, a raising and lowering mechanism consisting of the rotary horizontal shaft F provided at its end portions with pinions G and journaled in bearings upon standards rising from opposite sides of the body-frame, the operating hand-wheel H arranged on said shaft at a point between said pinions, and a couple of vertically movable racks I having jointed connections with the blade and arranged to respectively engage one and the other of the pinions on the end-portions of the rotary shaft, and a suitable brake arranged for temporarily locking the hand-wheel and accessible to an attendant standing upon the main-frame of the machine in rear of the hand-wheel, said members being combined and organized substantially as described.

7. A scraper comprising a vertically movable blade attached to swinging draft arms or bails, vertically movable side fenders, a rack or racks attached to the blade, and a hand-wheel and pinions for operating the racks, substantially as described.

8. A scraper comprising a vertically movable blade, a rock-shaft $q$ provided with an arm $q'$ and supported upon the main-frame of the machine in advance of the blade, cultivator teeth arranged upon said rock-shaft and raised and lowered by the rocking action of the same, and an operating device connected with the arm on the rock-shaft and available to an attendant standing upon the main-frame of the machine in rear of the scraper-blade, substantially as described.

9. A scraper comprising a vertically movable blade, a set of vibratory cultivator teeth arranged in advance of the blade, an elevated pinion and hand-wheel, and a rack operated by the pinion and connected with the set of cultivator teeth, substantially as and for the purpose described.

10. A scraper comprising a vertically movable blade, a set of cultivator teeth arranged for vertical movement, a rotary shaft provided with an operating hand-wheel and connected with the blade by suitable connection, and a hand-wheel loose upon the shaft and suitably connected with the set of cultivator teeth for the purpose of raising and lowering the same, substantially as described.

11. A scraper comprising a rotary shaft carrying a fast and a loose pinion a hand-wheel for operating the shaft and a hand-wheel for operating the loose pinion, a vertically movable blade, a set of vertically movable cultivator teeth, a rack engaging the fast pinion and connected with the blade, and a rack engaging the loose pinion and connected with the set of cultivator teeth, substantially as described.

12. A scraper comprising a vertically movable blade, vertically adjustable side fenders supported and arranged for vertical adjustment independently of the blade which is arranged for independent up and down movement between said fenders and supported transversely with relation to the fenders which are arranged longitudinally with relation to the length of the machine and means suitable for securing the fenders in adjustment, substantially as described.

13. A scraper comprising a vertically movable blade, vertically adjustable side fenders provided with slots, locking bolts extending through the slots in the fenders, and adjusting nuts on the bolts, substantially as described.

14. A scraper comprising a wheeled body-frame, a pair of vertically movable side fenders, and a blade arranged for up and down movement between and independently of the fenders and attached to swinging draft arms or bails pivotally hung in advance of the blade, substantially as described.

15. A scraper comprising a body-frame supported at the rear by wheels B, and at the front supported by a caster wheel, a pair of vertically movable side fenders, a vertically movable blade, and a set of cultivator teeth arranged forward of the blade, substantially as described.

BENJAMIN F. SHUART.

In presence of—
C. B. NEWTON,
C. F. SAWYER.